US009751430B2

(12) United States Patent
Geiges

(10) Patent No.: US 9,751,430 B2
(45) Date of Patent: Sep. 5, 2017

(54) DRIVE OF A SEAT ADJUSTING DEVICE FOR MOTOR VEHICLES

(71) Applicant: IMS GEAR SE & Co. KGaA, Donaueschingen (DE)

(72) Inventor: Christian Geiges, Blumberg (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 91 days.

(21) Appl. No.: 13/833,275

(22) Filed: Mar. 15, 2013

(65) Prior Publication Data

US 2014/0123783 A1 May 8, 2014

(30) Foreign Application Priority Data

Nov. 7, 2012 (EP) ..................................... 12191622

(51) Int. Cl.
*F16H 25/08* (2006.01)
*B60N 2/06* (2006.01)
*B60N 2/68* (2006.01)

(52) U.S. Cl.
CPC .............. *B60N 2/067* (2013.01); *B60N 2/682* (2013.01); *F16H 25/08* (2013.01); *Y10T 74/18056* (2015.01)

(58) Field of Classification Search
CPC .. Y10T 29/49968; B60N 2/682; B60N 2/067; F16H 25/08
USPC ............ 74/424.71, 89.37, 25; 248/424, 429; 403/256, 257, 259, 261
See application file for complete search history.

(56) References Cited

U.S. PATENT DOCUMENTS

| 5,393,028 | A * | 2/1995 | Satoh | B60N 2/0232 248/420 |
| 6,260,922 | B1 * | 7/2001 | Frohnhaus | B60N 2/067 248/424 |
| 6,688,667 | B2 * | 2/2004 | Nishimoto | B60N 2/0232 248/429 |
| 7,571,666 | B2 * | 8/2009 | Borbe | B60N 2/0232 297/344.1 |
| 7,658,429 | B2 * | 2/2010 | Koga | B60N 2/067 248/429 |

(Continued)

FOREIGN PATENT DOCUMENTS

| CN | 101 959 712 A | 1/2011 |
| DE | 100 03 305 C1 | 1/2000 |

(Continued)

OTHER PUBLICATIONS

Search Report issued by the European Patent Office, Apr. 8, 2013.

(Continued)

*Primary Examiner* — William Kelleher
*Assistant Examiner* — Randell J Krug
(74) *Attorney, Agent, or Firm* — Juneau & Mitchell

(57) ABSTRACT

Drive of a seat adjusting device, especially for motor vehicles, with a spindle that is fastened on a first of two rails, which are adjustable with respect to each other, by means of at least one mounting located at the end of the spindle and with a transmission driven by a motor that is mounted on the second rail, whereby the mounting has one part as a base plate, from which two walls at a distance from each other extend upward and that at least one end of the spindle is fastened between these two walls.

12 Claims, 2 Drawing Sheets

(56) References Cited

U.S. PATENT DOCUMENTS

| | | | |
|---|---|---|---|
| 8,770,063 B2* | 7/2014 | Bhatti | F16H 57/032 74/424.71 |
| 2006/0226674 A1* | 10/2006 | Ito et al. | 296/65.13 |
| 2006/0249644 A1* | 11/2006 | Folliot et al. | 248/429 |
| 2006/0278037 A1* | 12/2006 | Borbe | B60N 2/0232 74/640 |
| 2007/0051047 A1* | 3/2007 | Taubmann | B60J 7/0573 49/348 |
| 2008/0238167 A1* | 10/2008 | Koga | B60N 2/0232 297/344.1 |
| 2009/0242710 A1* | 10/2009 | Quertelet | H02G 3/32 248/65 |
| 2010/0133408 A1* | 6/2010 | Umezaki | B60N 2/067 248/429 |
| 2010/0242650 A1* | 9/2010 | Koga | B60N 2/0232 74/416 |
| 2011/0031774 A1* | 2/2011 | Koga | B60N 2/067 296/65.15 |
| 2011/0139954 A1* | 6/2011 | Ruess et al. | 248/429 |
| 2011/0278419 A1* | 11/2011 | Sovis | B60N 2/0232 248/429 |

FOREIGN PATENT DOCUMENTS

| | | |
|---|---|---|
| DE | 10 2010 063044 A1 | 12/2010 |
| EP | 2 191 999 A1 | 11/2009 |
| FR | 2 882 974 A1 | 3/2005 |
| KR | 2007-529351 | 10/2007 |
| KR | 2010-126027 | 6/2010 |

OTHER PUBLICATIONS

Office Action issued Jul. 27, 2015 by the Chinese Patent Office for parallel pending patent application No. 2013 1025 1493.1.

Office Action issued in corresponding Korean application No. 10-2013-0066710 on Jun. 19, 2015.

* cited by examiner

US 9,751,430 B2

DRIVE OF A SEAT ADJUSTING DEVICE FOR MOTOR VEHICLES

STATEMENT REGARDING FEDERALLY SPONSORED RESEARCH OR DEVELOPMENT

No federal government funds were used in researching or developing this invention.

CROSS REFERENCE TO RELATED APPLICATIONS

This patent application claims priority to European Patent Application 12 191 662.1, filed on Nov. 7, 2012.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a drive of a seat adjusting device for motor vehicles with a spindle that is fastened on a first of two rails, which can be adjusted relative to each other, by means of at least one mounting located on one end of the spindle and with a motor-driven transmission that is arranged on the second rail.

Such a drive is described in EP 1 068 093 B1. The drive is shown in the figure there and in the present FIG. 1. As can be seen, a retaining plate 1 on which the seat of the vehicle is to be fastened is assigned to an upper rail 3. On the retaining plate 1, mounting links 11 are provided for a motor 2 so that it can be tightly connected to the retaining plate 1 and thus tightly connected to the upper rail. On both sides of motor 2, drive shafts 21, 22 are arranged. Flexible shafts can be used for this. These drive shafts 21, 22 produce the connection to a transmission 9 that is described in detail in EP 1 068 093 B1.

The upper rail 3 glides directly, or over, adjusting and/or bearing elements that are not shown on a lower rail 4 that is fastened on a vehicle floor of the motor vehicle.

In the functional positions of upper rail 3 and lower rail 4, these are held by their contact and/or mounting areas so that a hollow space results. Inside this hollow space, a threaded spindle 5 is arranged. This threaded spindle 5 is held by mountings 6a and 6b, which are tightly mounted on the lower rail 4. For this purpose, the mountings 6a and 6b have fastener holes 6e through which suitable threaded connections or similar fasteners extend and are held on fastener holes 4a of the lower rail 4. The spindle 5 itself is bolted tightly on the mountings 6a and 6b using suitable fastening nuts 6c, 6d.

What is problematic in the drive shown in FIG. 1 is the design of the mountings 6a and 6b.

These mountings 6a, 6b designed with an L-shape are ordinarily manufactured as stamped bent parts. In this case, the mountings are first punched out of metal plates as strip-shaped elements and then bent in a right angle. In fact, such stamped bent parts are relatively easy to manufacture and are thus cost-effective. However, the strength of these mountings, which is too low, is a disadvantage. In fact, such stamped bent parts can absorb only limited forces in the case of a crash. In tests, it has been found that such stamped bent parts can handle relatively low forces of up to about 20 kN in the case of a crash.

BACKGROUND OF THE INVENTION

The current state of knowledge is as follows.

The goal of the invention is to further develop the known drive in such a way that in the case of a crash, higher forces can be absorbed by the mounting or mountings than were previously possible.

This goal is achieved by a drive as claimed herein.

BRIEF SUMMARY OF THE INVENTION

In a preferred embodiment, a drive of a seat adjusting device, especially for motor vehicles, comprising a spindle that is fastened on a first of two rails, which are adjustable with respect to each other, by means of a mounting located at the end of the spindle and with a transmission driven by a motor that is mounted on the second rail, further comprising wherein the mounting has one part as a base plate, from which two walls at a distance from each other extend upward and that at least one end of the spindle is fastened between these two walls.

In another preferred embodiment, the drive as disclosed, further comprising wherein the walls have at least approximately half the length of the base plate.

In another preferred embodiment, the drive as disclosed, wherein the two walls are two longitudinal legs of a U-strap, the base plate has two slots at a distance from each other that run at least approximately concentric to a spindle axis of the spindle and the two longitudinal legs of U-strap are slid from below the base plate through the slots such that a transverse leg of the U-strap is in contact with the underside of the base plate.

In another preferred embodiment, the drive as disclosed, further comprising wherein the base plate has a recess on its underside, in which the transverse leg of the U-strap engages so the mounting has an at least approximately flat underside.

In another preferred embodiment, the drive as disclosed, further comprising wherein the base plate, on its upper side, has an elevation that is opposite the recess on the underside of the base plate.

In another preferred embodiment, the drive as disclosed, further comprising wherein the base plate and the U-strap are tightly connected to each other, especially welded, bonded, toxed or clinched.

In another preferred embodiment, the drive as disclosed, further comprising wherein the base plate and/or the transverse strap consist of metal, especially steel, sheet steel, metal casting or the like.

In another preferred embodiment, the drive as disclosed, further comprising wherein the base plate has at least one hole, and such holes, if a plurality, are arranged next to each other seen in the axial direction of the spindle.

In another preferred embodiment, the drive as disclosed, further comprising wherein the base plate has a rectangular outer contour.

Figure 2:
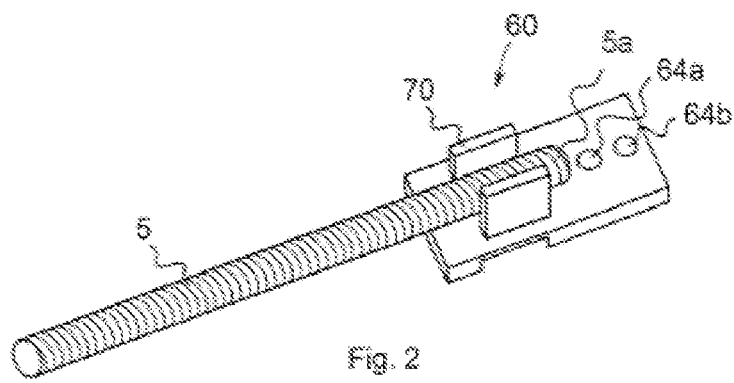
FIG. 2 is a line drawing evidencing the part of a spindle similar to FIG. 1, but with a mounting fastened at one end of the spindle that is designed according to an exemplary embodiment of the invention.
Figure 3:
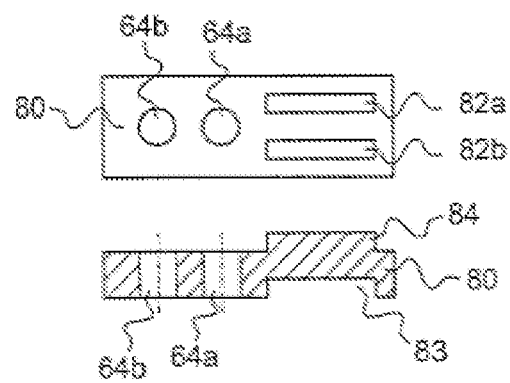
Figure 4:
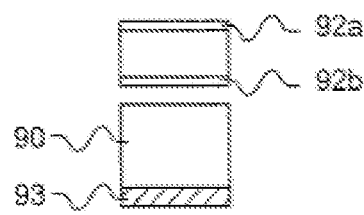
Figure 5:
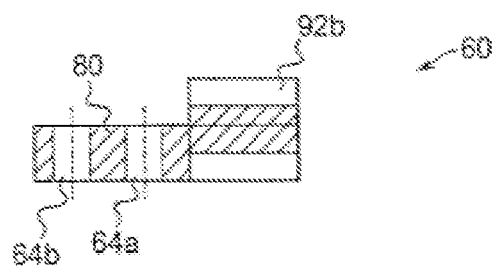

Each of FIGS. 3, 4 and 5 is a line drawing evidencing a different view of the mounting shown in FIG. 2.

DETAILED DESCRIPTION OF THE INVENTION

The invention essentially consists in that part of the mounting is a base plate, from which two walls at a distance from each other extend upward and at least one of the ends of the spindle is fastened between these two walls, and preferably welded tightly.

In a preferred exemplary embodiment of the invention, the walls are aligned concentrically to the spindle axis and are about half the length of the base plate.

An especially simple embodiment of the mounting according to the invention consists of a design variant, in which the two walls of the mounting are the two longitudinal legs of a U-strap, which run in two slots at a distance from each other that and are at least approximately concentrically to the spindle axis and that these slots are machined into the base plate. In this case, the U-strap is slid from below the base plates with its two longitudinal legs through the base plate in such a way that a transverse clip of the U-strap that connects the two longitudinal legs on their underside is in contact with the underside of the base plate.

A further development of the invention provides that the base plate has a recess on its underside, in which the transverse leg of the U-strap engages. Because of this, the underside of the entire mounting can have an at least approximately flat underside, so the mounting can rest firmly on a base without tipping.

Another further development of the invention provides that the base plate has an elevation on its upper side exactly at the point where the recess discussed above is located.

In this embodiment, the base plate is pressed from its underside with a suitable stamp so the recess is formed on the underside and a corresponding elevation occurs on the upper side of the base plate.

Another embodiment of the invention provides that the base plate and the U-strap are tightly connected to each other, especially welded, bonded, peened or toxed. Toxing (also called clinching) is understood to mean a joining process for connecting sheet metal and profiles. In this process non-detachable connections are produced using local cold forming without additional and/or fastening parts. The main characteristic of this joining technique consists in that the form-fitting connection is formed from the material of the metal sheets and/or parts to be connected. The known work steps in toxing consist of placement of the parts to be joined between stamp and die and subsequent pressing of the materials to be connected into the die by the stamp. If there is further force build-up, the stamp-side material flows into the die form. As a result, a spot-shaped connection is made without edges or burs. A special advantage of toxing is seen in that outstanding corrosion resistance is maintained for galvanized and painted metal sheets and/or parts, since the protective layer is also included.

The peening connecting technique that is also possible is a similar process, but its difference from toxing consists in that instead of a spot-shaped connection, a longish, crease-like connection of the metal sheets and/or parts occurs with few sharp edges.

A further development of the invention provides that the base plate and/or the U-strap consists of metal, especially steel or sheet steel or metal castings. In this case, the base plate and the U-strap can be formed from the same material or from different material.

For fastening a mounting that is designed in this way for holding one end of the spindle, at least one hole, and preferably two holes, are machined into the base plate. If there are two holes, seen along the spindle axis, the holes lie next to each other in longitudinal direction with respect to the spindle axis.

Advantageously, the base plate has a rectangular outer contour.

The significant advantage of such a mounting, which is designed in two parts according to the further development named above, namely with a base plate with slot and a U-strap installed in the slot, consists in that such a mounting is optimized for construction space and also ensures an additional increase in strength for a seat longitudinal adjusting drive. This higher strength occurs with a simultaneous greater stiffness of the mounting and a lower forward displacement. The mounting according to the invention requires only a small installation space, is distinguished by higher strength and can replace previously used mountings without problems. Because of the use of a U-strap, a flexible interface design is ensured with respect to standardization of the adjusting drives. Because of the spacing of the two walls extending from the base plate, various spindle diameters can be considered. Overall, the mounting according to the invention is distinguished by a reduction in manufacturing steps and thus by lower costs.

DETAILED DESCRIPTION OF THE FIGURES

Figure 1:
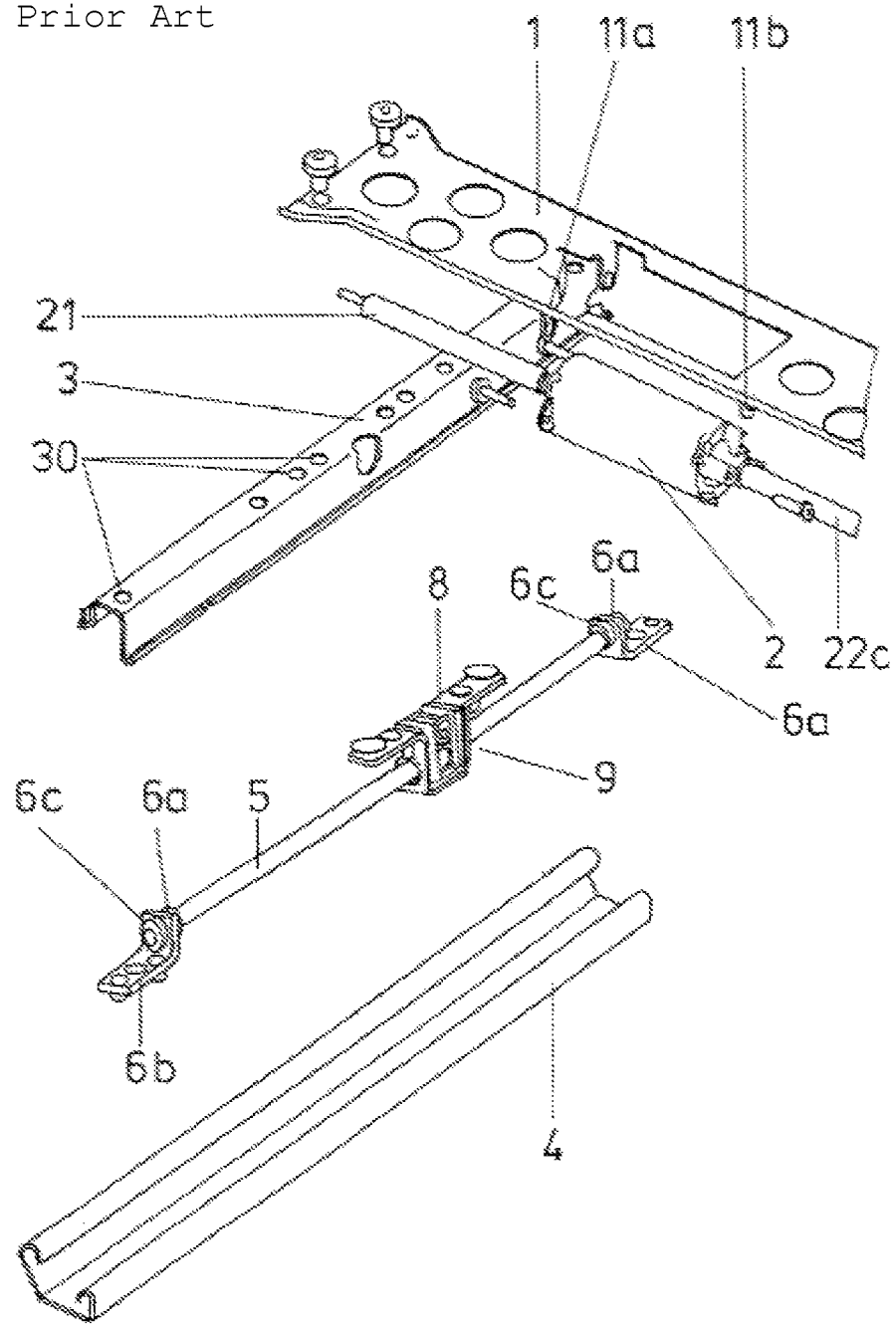
FIG. 1 is a line drawing evidencing the drive already explained according to the known state of the art with a spindle fixed at its end by mountings on which a transmission that can move longitudinally rests.

Referring now to the figures, in FIG. 2, similarly to FIG. 1, a spindle 5 is shown, but only in the area of one of the two ends of spindle 5. The remaining components, especially the gear 9 that can be driven on the spindle 5, are left out in FIG. 2 for better clarity.

In contrast to the illustration in FIG. 1, the spindle 5 is tightly connected at its end 5a with a specially designed mounting 60, which will be described in more detail in connection with FIGS. 3 to 5.

The mounting 60 has a rectangular base plate of metal, especially of steel or sheet steel or the like. The base plate is provided with the reference number 80 and has, as can be seen from the top view and the side view in FIG. 3, two fastener holes 64a and 64b, which are arranged next to each other in spindle axial direction of the spindle 5 and, in fact, in the representation in FIG. 3, in the left area of the base plate 80 two slots 82a and 82b are found that are at a distance from each other and also parallel to the spindle axis of spindle 5. These slots 82a and 82b extend over about half, or at least approximately half, of the base plate 80.

From the cross section representation in FIG. 3, it can be seen that on its right part, the base plate 80 has a recess 83 and opposite on its upper side a corresponding elevation 84. This recess 83 and the corresponding elevation 84 can be created by a suitable stamping tool, in that the base plate 80 is stamped from the bottom in order to create the recess 83 on the underside and the corresponding elevation 84 on the upper side.

FIG. 4 shows a second part of the mounting 60, namely a U-shaped strap 90 that has two longitudinal legs 92a, 92b lying opposite each other, which on their undersides are connected to a transverse leg 93. The U-strap preferably consists of metal, especially steel or sheet steel or the like.

The U-strap 90 is designed in such a way that its longitudinal legs 92a, 92b can be inserted through the slots 82a, 82b of the base plate 80 shown in FIG. 3 so the transverse leg 93 lies in the recess 83 of the base plate 80.

FIG. 5 shows the cross section view of the mountings 60 consisting of the two parts, base plate 80 and U-strap 90, in assembled state and in cross sectional representation. FIG. 2 shows this mounting 60 in perspective representation, whereby the end 5a of spindle 5 is inserted between the two longitudinal legs 92a, 92b of the U-strap 90 and fastened there is a suitable way. This fastening can occur by welding, for example. As an example, in FIG. 2 the associated weld seam is indicated between spindle 5 and the inside of the longitudinal leg 92a.

LIST OF REFERENCE NUMBERS

1 Retaining plate
2 Drive motor
3 Upper rail
4 Lower rail
4a Fastener hole
5 Spindle
5a Spindle end
6 Mounting
6a Mounting
6b Mounting
6c Fastening nut
6d Fastening nut
8 Mounting
8a Fastener hole
9 Transmission
11 Mounting link
21 Drive shaft
22 Drive shaft
60 Mounting
64a, 64b Holes
70 Weld seam
80 Base plate
82a, 82b Slots
83 Recess
84 Elevation
90 U-strap
92a, 92b Longitudinal legs/walls
93 Transverse leg The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A drive of a seat adjusting device, especially for motor vehicles, comprising a spindle that is fastened on a first of two rails, which are adjustable with respect to each other, by means of a two-part mounting, comprising a base plate and a U-strap, located at the end of the spindle and with a transmission driven by a motor that is mounted on the second rail, further comprising wherein two walls at a distance from each other extend upward from the base plate and that at least one end of the spindle is fastened between these two walls, wherein the two walls are two longitudinal legs of the U-strap, the base plate has two slots at a distance from each other that run at least approximately parallel to a spindle axis of the spindle and the two longitudinal legs of the U-strap are slid from below the base plate through the slots such that a transverse leg of the U-strap is in contact with the underside of the base plate wherein the base plate has a recess on its underside, in which the transverse leg of the U-strap engages so the mounting has an at least approximately flat underside and wherein the upper side of the base plate comprises a formed elevation that is opposite the recess on the underside of the base plate, such elevation and recess each extending across the width of the base plate.

2. The drive of claim 1, further comprising wherein the walls have at least approximately half the length of the base plate.

3. The drive of claim 1, further comprising wherein the base plate and the U-strap are tightly connected to each other by one of the processes taken from the group consisting of welding, bonding, toxing and clinching.

4. The drive of claim 1, further comprising wherein the base plate and the transverse leg consist of metal taken from the group consisting of steel, sheet steel and metal casting.

5. The drive of claim 1, further comprising wherein the base plate has at least one hole, and such holes, if a plurality, are arranged next to each other and are collinear with the axial direction of the spindle.

6. The drive of claims 1, further comprising wherein the base plate has a rectangular outer contour.

7. A drive of a seat adjusting device, especially for motor vehicles, comprising a spindle that is fastened on a first of two rails, which are adjustable with respect to each other, by means of a two-part mounting, comprising a base plate and a U-strap, located at the end of the spindle and with a transmission driven by a motor that is mounted on the second rail, further comprising wherein two walls at a distance from each other extend upward from the base plate and that at least one end of the spindle is fastened between these two walls, wherein the two walls are two longitudinal legs of the U-strap, the base plate has a rectangular outer contour and two slots at a distance from each other that run at least approximately parallel to a spindle axis of the spindle and the two longitudinal legs of the U-strap are slid from below the base plate through the slots such that a transverse leg of the U-strap is in contact with the underside of the base plate and such that the two longitudinal legs are each located at a set distance within the edges of the rectangular outer contour of the base plate, wherein the base plate has a recess on its underside, in which the transverse leg of the U-strap engages so the mounting has an at least approximately flat underside and the base plate, such elevation and recess each extending across the width of the base plate.

8. The drive of claim 7, further comprising wherein the walls have at least approximately half the length of the base plate.

9. The drive of claim 7, further comprising wherein the base plate and the U-strap are tightly connected to each other by one of the processes taken from the group consisting of welding, bonding, toxing and clinching.

10. The drive of claim 7, further comprising wherein the base plate and the transverse leg consist of metal taken from the group consisting of steel, sheet steel and metal casting.

11. The drive of claim 7, further comprising wherein the base plate has at least one hole, and such holes, if a plurality, are arranged next to each other and are collinear with the axial direction of the spindle.

12. The drive of claim 7, further comprising wherein the base plate has a rectangular outer contour.

* * * * *